US008417756B2

(12) United States Patent
Pisek et al.

(10) Patent No.: US 8,417,756 B2
(45) Date of Patent: Apr. 9, 2013

(54) METHOD AND APPARATUS FOR EFFICIENT MODULO MULTIPLICATION

(75) Inventors: Eran Pisek, Plano, TX (US); Thomas M. Henige, Dallas, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1287 days.

(21) Appl. No.: 12/216,896

(22) Filed: Jul. 11, 2008

(65) Prior Publication Data

US 2009/0144353 A1 Jun. 4, 2009

Related U.S. Application Data

(60) Provisional application No. 60/996,678, filed on Nov. 29, 2007.

(51) Int. Cl.
G06F 7/38 (2006.01)
(52) U.S. Cl. ...................................................... 708/491
(58) Field of Classification Search .................. 708/491, 708/492
See application file for complete search history.

(56) References Cited

U.S. PATENT DOCUMENTS 5,499,299 A * 3/1996 Takenaka et al. ............... 380/28
6,182,104 B1 1/2001 Foster et al.
7,826,612 B2 * 11/2010 Kounavis et al. ............... 380/28
2004/0098435 A1 * 5/2004 Moore .......................... 708/491
2008/0065713 A1 * 3/2008 Lee et al. ...................... 708/491

OTHER PUBLICATIONS

"Modular arthmetic", Wikipedia, available at http://en.wikipedia.org/wiki/Montgomery_reduction, (2008).
*3GPP TS 25.212 V7.7.0* (Nov. 2007) (i.e., Document No. 25212-770) "*Technical Specification Group Radio Access Network; Multiplexing and channel coding (FDD) (Release 7)*", Nov. 11, 2007.

\* cited by examiner

*Primary Examiner* — Chuong D Ngo

(57) ABSTRACT

A method of a hardware based Montgomery reduction contemplates preparing a table comprising a plurality of sets of values of $2^{K+i}$ (mod n), $2^{K+i+1}$ (mod n) and $(2^{K+i}+2^{K+i+1})$ (mod n), where i=0 to M−2, n is a modulo number, K is an integer, and M is a number of significant bits in a binary Y; selecting one of the values within one of the plurality of sets of the table in dependence upon a value of two neighboring bits $Y_{i+1,i}$ of the binary Y; adding two neighboring selected values and calculating the modulo value of the sum value with the modulo number n; repeatedly adding two neighboring calculated modulo values and calculating the modulo value of the intermediate sum of the two neighboring calculated modulo values until only a single calculated module value is obtained; and setting the single value as the Montgomery representation.

22 Claims, 4 Drawing Sheets

Computation complexity = K (number of bits)
Max Cycles = K/2 (assuming need F/F every 2 stages)

METHOD AND APPARATUS FOR EFFICIENT MODULO MULTIPLICATION

CLAIM OF PRIORITY

This application makes reference to, incorporates the same herein, and claims all benefits accruing under 35 U.S.C.§119 from an application earlier filed in the U.S. Patent & Trademark Office on 29 Nov. 2007 and there duly assigned Ser. No. 60/996,678.

BACKGROUND OF THE INVENTION

1. Field of the Invention

The present invention relates to a method for a hardware based Montgomery reduction supporting modulo multiplication and an apparatus performing this method, and more particularly, to a hardware based Montgomery reduction requesting less accumulation complexity and fewer maximum calculation cycles and an apparatus performing this method.

2. Description of the Related Art

The contemporary software based modulo multipliers implanted in Modems, for example, for calculating the S-table for the WCDMA (Wideband Code Division Multiple Access) Interleaver, fail to support the increasing bit-rates. As an instance, an HSDPA+ (High-Speed Downlink Packet Access plus) solution usually operates on a bit-rate of approximately 30 Mbps. The overhead time of calculating those S-tables in SW-based solutions may significantly impact the total processing time and limit the overall performance.

Several hardware based solutions were introduced to support hardware based Modulo Multipliers as follows.

In a straight forward approach, the modulo is checked upon the completion of each addition step. This approach however may result in a large number of gates as well as a long calculation time due to many critical procedural steps. For example, in a step of checking whether an intermediate calculated result is bigger than n (i.e., the modulo number), the calculation process has to wait until the MSB (most significant byte) of a comparator is updated and thus deciding whether the intermediate calculated result should be subtracted by n or not.

In another HW option, a step of subtracting m·n from the total result R is employed, where m is the number to satisfy the equation of R−m·n<n. This prior art solution may take up to m calculation cycles, and the value of m may be very large and thus requiring large bits calculation.

One of the most recent effort in the art, U.S. Pat. No. 6,182,104, "Circuit And Method Of Modulo Multiplication", by Foster, et al., suggests the Montgomery reduction for supporting the Modulo multiplication. The Montgomery reduction is an algorithm that supports Modulo multiplication and eliminates the need to subtract n from the intermediate result. This Montgomery reduction scenario was primarily designed for encryption and decryption Algorithms and it may be applied to modems. In order to avoid the subtraction of n, each multiplicand needs to be firstly converted to a Montgomery Representation. The drawback of this scenario is that, even though for an encryption and decryption algorithm, the Montgomery conversion is very simple (used only for modular exponention). This method may become very complicated when applied to modem algorithms and applied to real modulo multiplication (such as WCDMA/HSDPA+ S Table calculation). This drawback therefore, prohibits the use of the Montgomery reduction algorithm in modems.

SUMMARY OF THE INVENTION

It is therefore an object of the present invention to provide an improved hardware based Montgomery reduction supporting modulo multiplication.

It is another object to provide a hardware based Montgomery reduction supporting modulo multiplication able to realize small bits calculation, short calculation time and easiness of implantation to the modem algorithms.

It is still another object to provide a hardware based Montgomery reduction, and apparatus performing a hardware based Montgomery reduction, able to address the foregoing disadvantages of the contemporary Montgomery reduction scenarios.

It is another object of the present invention to provide a hardware based Montgomery reduction supporting modulo multiplication, with the Montgomery reduction requesting less accumulation complexity and less maximum calculation cycles, and an apparatus performing the Montgomery reduction.

The Montgomery reduction contemplates steps of preparing a table of a plurality of sets, each of the sets including a value of $2^{K+i}$ (mod n), a value of $2^{K+i+1}$ (mod n) and a value of $(2^{K+i}+2^{K+i+1})$(mod n) corresponding to a value of two neighboring bits $Y_{i+1,i}$ of a binary Y, where i=0 to M−2, n is a predetermined modulo number, K is a predetermined integer, and M is a number of significant bits in the binary Y; selecting one of the values within each of the plurality of sets of the table in dependence upon the value of the two neighboring bits $Y_{i+1,i}$ of the binary Y; respectively adding each pair of two neighboring selected values and respectively calculating the modulo value of the summed values with the modulo number n; repeatedly summing each pair of two neighboring calculated modulo values output from a previous calculation stage until only a single summed value is obtained, and repeatedly calculating the modulo value of the intermediate summed results of the two neighboring calculated modulo values until only a single calculated module value is obtained; and setting the single calculated modulo value as the Montgomery representation.

The step of preparing the table may be performed by storing the table in a memory before making the selection of values from the table.

The step of preparing the table may be performed by calculating the values of the table simultaneously and in parallel with the step of making the selection of values from the table.

The step of preparing the table may be performed by partially storing the table in a memory before making the selection of values from the table and then partially calculating the values of the table simultaneously and in parallel with the step of making the selection of values from the table.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

References are cited as follows:

U.S. Pat. No. 6,182,104, "Circuit and method of modulo multiplication", Foster, et al. discloses a recent developed Montgomery reduction which is however very complicated when applied to the application of Modem algorithms; and The contents of link http://en.wikipedia.org/wiki/Montgomery_reduction disclose a description of conventional or classic Montgomery reduction.

3GPP TS 25.212 V7.7.0 (2007-11) (i.e., Document No. 25212-770) "Technical Specification Group Radio Access Network; Multiplexing and channel coding (FDD) (Release 7)", Nov. 11, 2007, describes the characteristics of the Layer one multiplexing and channel coding in the FDD mode of UTRA.

The contemporary SW-based (software based) modulo multipliers implanted in modems, for example, for calculating the S-table for the WCDMA (Wideband Code Division Multiple Access) interleaver, fail to support the increased bit-rates for data transmission. As an instance, a HSDPA+ (High-Speed Downlink Packet Access plus) solution operates on a bit-rate of approximately 30 Mbps. The overhead time for calculating those S-tables in SW-based solutions may significantly impact the total processing time and thereby limit the overall performance of calculation.

Several hardware based solutions were introduced to support hardware based modulo multipliers as follows.

In one of these solutions, a straight forward approach, the modulo is checked upon the completion of each step of addition. This approach may result in a large number of gates as well as a long calculation time due to many critical arithmetic steps. For example, in a step of checking whether an intermediate calculated result is bigger than n (i.e., a modulo number), the calculation process must wait until the MSB (most significant byte) of a comparator is updated and thus deciding whether the intermediate calculated result should be subtracted by n or not.

Figure 1:
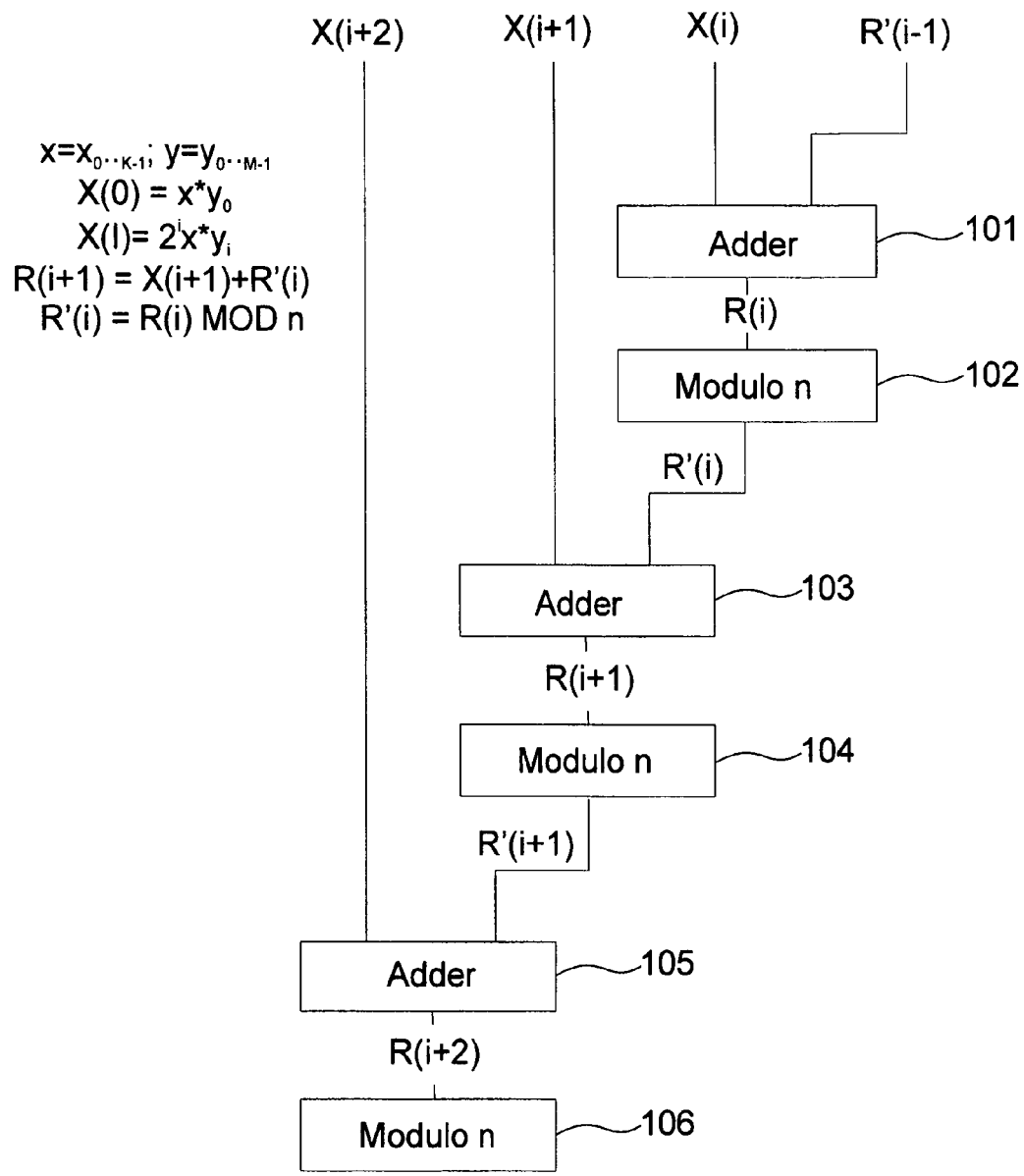
FIG. 1 is a block diagram illustrating a contemporary hardware based solution for calculating x·y (mod n), where "x" and "y" refer to $2^k$ and a binary value respectively, "n" is a modulo number and "mod" is a modulo operation.

FIG. 1 shows a contemporary hardware based solution for calculating x·y (mod n), where x and y refer to $2^K$ and a binary value respectively, n is the modulo number and "mod" is a modulo operation calculating the remainder of division of two numbers. Here, x and y may be represented by a set of binary bits each bit represent the existence of corresponding power of 2.

When calculating x·y (mod n), the Binary value y may be represented by $y_{M-1} \, y_{M-2} \ldots y_i \ldots y_2 \, y_1 \, y_0$ with $y_i$ being one of the bits of the binary value y, where M is significant bits of y. The value of (x·y) may be reformed to:

$$x \cdot y = x \cdot (2^{M-1} \cdot y_{M-1} + 2^{M-2} \cdot y_{M-2} \ldots + \qquad (1)$$
$$2^i \cdot y_i \ldots + 2^2 \cdot y_2 + 2^1 \cdot y_1 + 2^0 \cdot y_0)$$
$$= x \cdot 2^{M-1} \cdot y_{M-1} + x \cdot 2^{M-2} \cdot y_{M-2} \ldots + x \cdot 2^i \cdot y_i \ldots +$$
$$x \cdot 2^2 \cdot y_2 + x \cdot 2^1 \cdot y_1 + x \cdot 2^0 \cdot y_0.$$

Here, X(0) represents $x \cdot 2^0 \cdot y_0$ and X(i) represents $x \cdot 2^i \cdot y_i$, and R(i+1)=X(i+1)+R'(i) and R'(i)=R(i) (mod n). R(0) refers to value of (x·y₀) (mod n). Adder 101 adds inputs R'(i−1) to X(i) and obtains R(i), and the resulting R(i) is executed by (Modulo n) stage 102. Adder 103 further adds the resulting R'(i) forwarded from the previous calculating stage and thus obtaining R(i+1). Similar periodical calculating steps are performed by adders 104, 105 and modulo stages 104 and 106. In this scenario, in the step of checking whether the intermediate calculated result R(i) is bigger than n, the calculation process needs to wait until the MSB (most significant byte) of a comparator is updated and thus deciding whether the intermediate calculated result should be subtracted by n or not. Therefore, this approach may result in a large number of gates as well as a long calculation time due to many critical procedural steps.

In this solution, the computation complexity is K, and the maximum calculation cycle is K/2 on the assumption of flip-flop (F/F) every two stages, where K is the power of 2 in $x=2^K$.

In another HW solution, a step of subtracting m·n from the total multiplication result R=x·y is employed, where m is the number to satisfy the equation of R−m·n<n. This prior art solution may take up to m calculation cycles, and the value of m may be very large and thus requiring large bits calculation.

Figure 2:
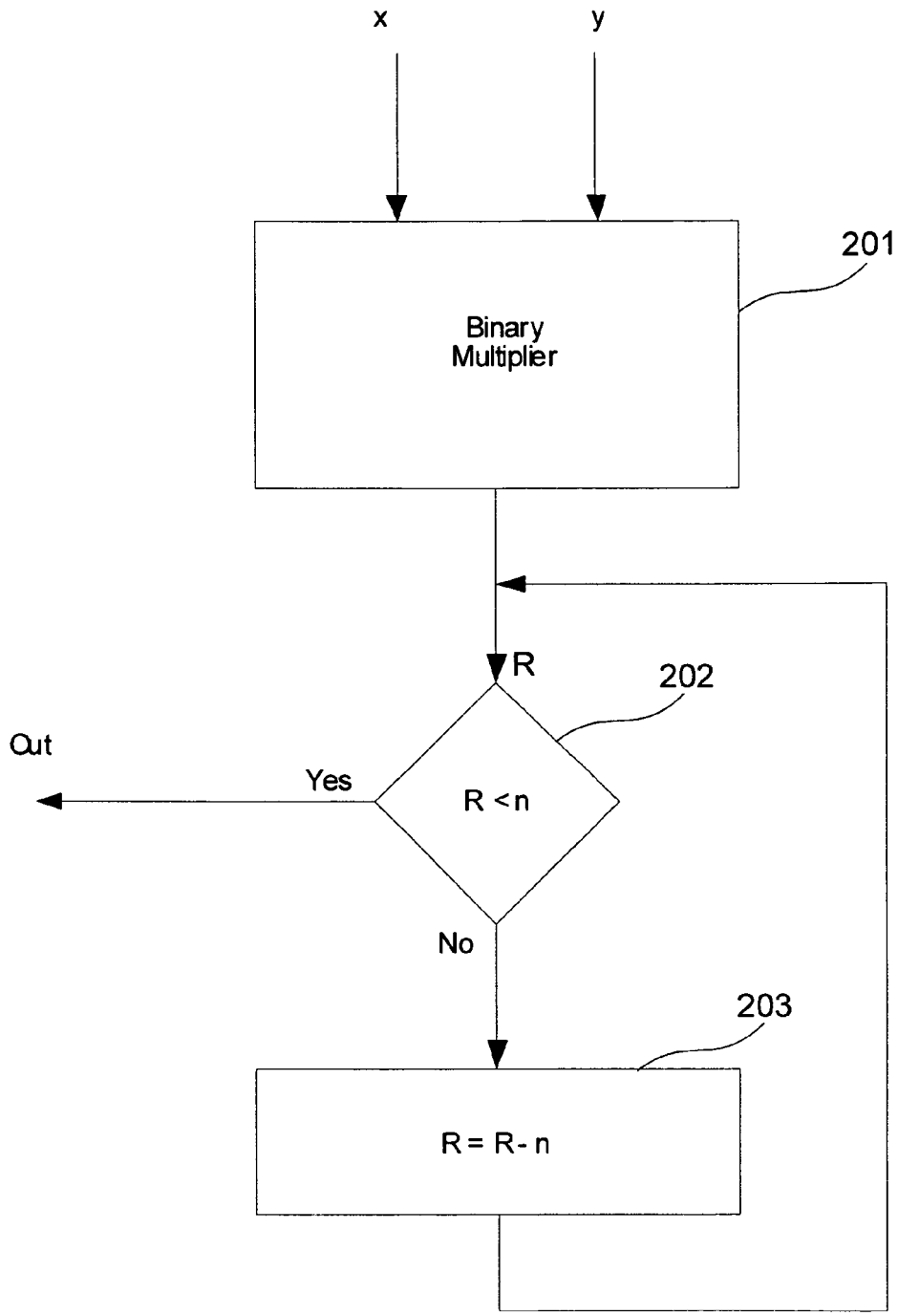
FIG. 2 is a block diagram illustrating another contemporary hardware based solution including a step of subtracting the product, m·n, from a multiplied resulting value R=x·y.

In FIG. 2, the HW solution including a step of subtracting m·n from a multiplication resulting value R=x·y is shown.

Firstly, values x and y are multiplied by binary multiplier 201 and thus an intermediate value R is obtained; and secondly, the intermediate value R is compared with the modulo number n at stage 202. When R<n, the instant value of R is the result of x·y (mod n) and is output; and when R≧n, the instant value of R is subtracted by the m·n (step 203) and R has an updated value of R=R−m·n, where m is a value which satisfies the equation R−m·n<n. When m=1 (as shown in FIG. 2), single subtract of n from the intermediate value R is performed in every cycle.

In this case, the computation complexity is $\log_2 K$, and the number of the maximum calculation cycles is $2^{(K+M)}/n$ on the assumption of m=1. Additionally, this scenario requires that the system can execute (K+M) bits calculations. Here, K is the power of 2 in $x=2^K$ and M is the significant bits of y.

As another hardware solution, Montgomery reduction is an algorithm introduced by Peter L. Montgomery in 1985 (reference (2)). The following description of classic Montgomery reduction is retrieved from the following link: "http://en.wikipedia.org/wiki/Montgomery_reduction".

It is used in modular arithmetic as an efficient way of performing an exponentiation of two numbers modulo a large number, for example, $c=a^b$ (mod n).

Formal Statement

A description of the classic Montgomery reduction is provided as follows.

n if defined as a positive integer, and R and T are integers such that R>n, gcd(n,R)=1 (i.e., the greatest common divisor of n and R is equal to 1), and 0≦T<n·R. The Montgomery reduction of "T mod n" with respect to R is defined as the value of (TR⁻¹ mod n), where R⁻¹ is the Modular inverse of R. The Montgomery reduction is much more efficient than the classical method of taking a product over the integers and reducing the result modulo n.

Uses in Cryptography

Many important cryptosystems such as RSA (an algorithm for public-key cryptography) and DSA (discrete stochastic arithmetic) are based on arithmetic operations, such as multiplications, modulo of a large number. A conventional method of calculating the modular product involves a first step of multiplying integers and a second step of taking the modulo of the resulting product of the integers. The modular reduction is however very expensive computationally, thus it is equivalent to dividing two numbers.

The situation becomes worse when the algorithm requires modular exponentiation. Classically, $a^b$ (mod n) is calculated by repeatedly multiplying a by itself for b times, each time reducing the result modulo n. Note that taking a single modulo at the end of the calculation will result in increasingly larger intermediate products, infeasible when b is extremely large. Using a Montgomery representation of the numbers allows calculating $a^b$ (mod n) for any b with only two modular reduction steps. An outline of the algorithm is shown as below:

Find a suitable R as described above;
Use a classical modular reduction to calculate $a_0 = a \cdot R$ (mod n), here, one modular reduction is performed;
Use the Montgomery reduction algorithm to repeatedly calculate $$a_i = a_0 \cdot a_{i-1} \cdot R^{-1} (\mathrm{mod}\ n) = a^{i+1} \cdot R(\mathrm{mod}\ n), \quad (2)$$

here, no modular reduction is performed and the Montgomery reduction executed in each calculation cycle prevents the intermediate results from growing into a large value; and Use the classical modular reduction again to calculate:

$$a_{b-1} \cdot R^{-1} = a^b (\mathrm{mod}\ n), \quad (3)$$

here, one classical modular reduction is performed.

There are several optimizations for this algorithm, the most obvious of which being exponentiation by squaring.

One of the most recent prior art, U.S. Pat. No. 6,182,104, "Circuit and method of modulo multiplication" (reference (1)), suggests the Montgomery reduction for supporting the modulo multiplication. The Montgomery reduction is an algorithm for modulo multiplication that eliminates the need for subtracting of n from the intermediate result. This Montgomery reduction scenario was primarily designed for Encryption/Decryption Algorithms and it may be applied to Modems. In order to avoid the subtraction of n, each multiplicand needs to be firstly converted to a Montgomery representation.

Figure 3:
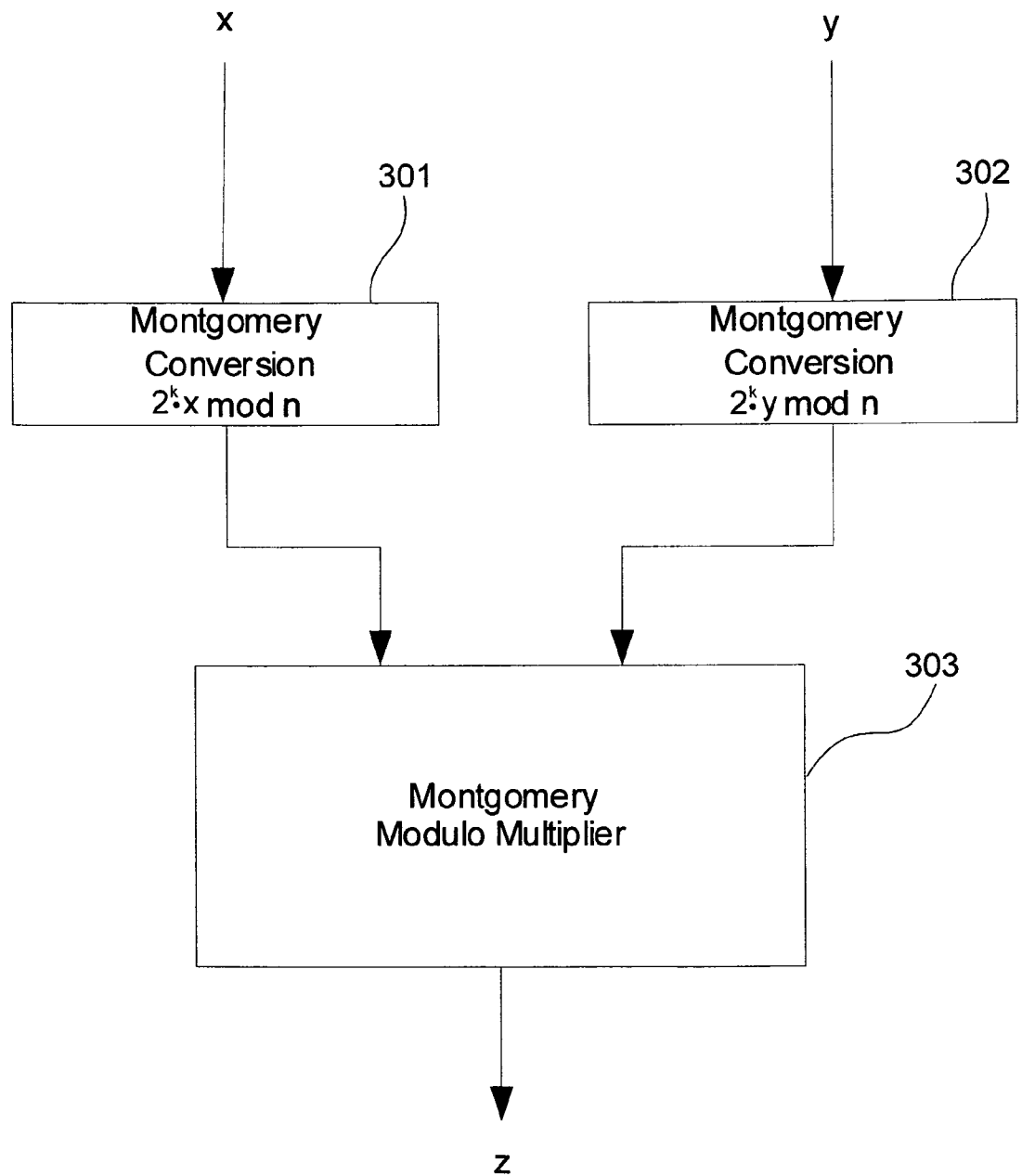
FIG. 3 is a block diagram illustrating another contemporary Montgomery reduction scenario primarily designed for Encryption/Decryption Algorithms.

FIG. 3 shows the above stated contemporary scenario. At steps 301 and 302, multiplicands x and y are respectively converted to Montgomery Representations. At step 303, the Montgomery representations calculated at stages 301 and 302 are processed by a Montgomery modulo multiplier.

The drawback of this scenario is that, even though for an encryption and decryption algorithm, the Montgomery conversion is very simple (used only for modular exponention, see figures), this method may become very complicated when implanted in Modem algorithms and real modulo multiplication (such as S-Table calculation in WCDMA/HSDPA+). This drawback therefore prohibits the use of this algorithm in Modems. Sections 4.2.3.2.3.1 and 4.2.3.2.3.2 of 3GPP TS 25.212 V7.7.0 (2007-11) (i.e., Document No. 25212-770) "Technical Specification Group Radio Access Network; Multiplexing and channel coding (FDD) (Release 7)", Nov. 11, 2007, disclose the methods for calculating S-Table. The previous element S(j−1) in S-Table is feedback for calculating the instant element S(j), and thus reduction of the calculation time for each element in S-Table is critical to the overall latency of the S-Table calculation.

In order to solve the above problems existing in the contemporary hardware based solution supporting modulo multipliers in modems, the proposed algorithm supporting the Modulo multiplication is based on Montgomery reduction in the present invention, and suggests a more efficient way to implement the Montgomery conversion in hardware based solution.

Aspects, features, and advantages of the present invention are readily apparent from the following detailed description, simply by illustrating a particular embodiment and implementations, including the best mode contemplated for carrying out the invention. The present invention is also capable of other and different embodiments, and several details can be modified in various obvious respects, all without departing from the spirit and scope of the invention. Accordingly, the drawings and description are to be regarded as illustrative in nature, and not as restrictive. The present invention is illustrated by way of example, and not by way of limitation, in the figures of the accompanying drawings.

Figure 4:
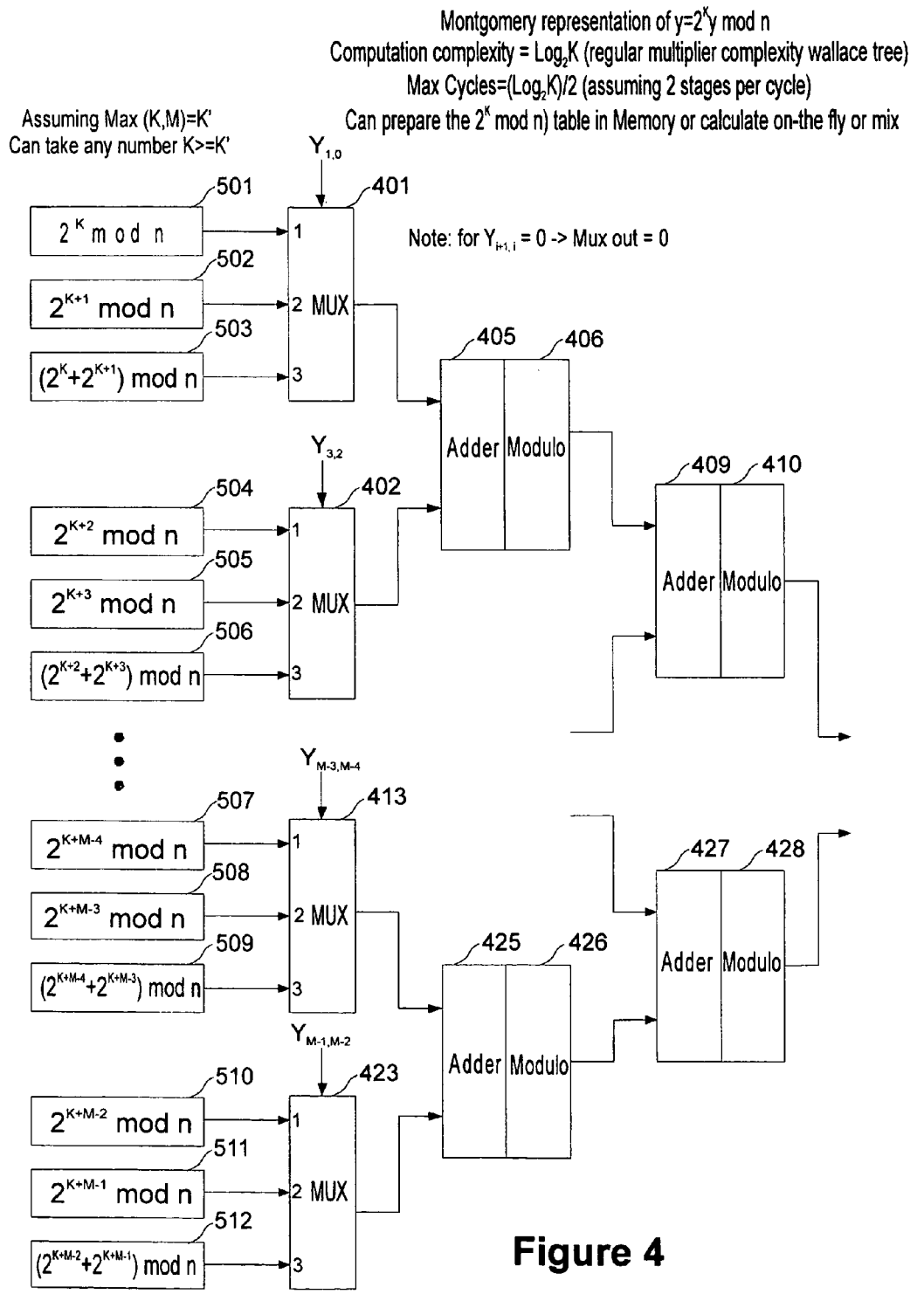
FIG. 4 is a block diagram illustrating a method of Montgomery reduction constructed as one embodiment of the present invention.

FIG. 4 describes an embodiment of the present invention for the proposed Montgomery conversion supporting the modulo multiplication. For the Montgomery representation, $y = 2^K \cdot Y$ (mod n), where "X" and "Y" refer to $2^K$ and a binary value respectively. The binary value Y may be represented by $Y_{M-1}\ Y_{M-2} \ldots Y_i \ldots Y_2\ Y_1\ Y_0$ with $Y_i$ being one bit of Y. $2^K \cdot Y$ may be then represented as equation (4):

$$2^K \cdot Y = 2^K \cdot (Y_{M-1}\ Y_{M-2} \ldots Y_i \ldots Y_2\ Y_1\ Y_0). \quad (4)$$

$Y_{M-1,M-2}, Y_{M-3,M-2}, \ldots, Y_{i+1,i}, \ldots, Y_{3,2}, Y_{1,0}$ are sets of two neighboring bits of Y with each set representing values of 0-3 (i.e., 00, 01, 10 and 11). $2^K \cdot Y$ may be then represented as equation (5):

$$2^K \cdot Y = 2^K \cdot (Y_{M-1,M-2}\ Y_{M-3,M-2} \ldots Y_{i+1,i} \ldots Y_{3,2}\ Y_{1,0}), \quad (5)$$

where M is the number of significant bits of Y.

$2^K \cdot Y$ therefore may be represented by a sum of one of $2^K \cdot 2^{i+1}$, $2^K \cdot 2^i$, and $2^K \cdot (2^{i+1} + 2^i)$ dependent upon the value of each $Y_{i+1,i}$ (i=0 to M−2). $2^K \cdot Y$ (mod n) may be obtained by, firstly, for two neighboring $Y_{i+1,i}$s of Y, adding one of $2^K \cdot 2^{i+1}$ (mod n), $2^K \cdot 2^i$ (mod n), and $2^K \cdot (2^{i+1} + 2^i)$ (mod n) dependent upon the value of each of the neighboring $Y_{i+1,i}$s; secondly, respectively processing the intermediate sums by modulo stages; and thirdly, repeatedly adding two neighboring modulo results followed by calculating the modulo value of the newly obtained intermediate sum. At the end of the repetition, only single modulo result exists and this single modulo result is determined as the value of $2^K \cdot Y$.

Multiplexer (MUX) 401 may select inputs 501, 502 and 503 according to input $Y_{1,0}$. For example, when $Y_{1,0}$ is equal to 01, input 501, i.e., $2^K$ (mod n), is selected by MUX 401 and the output of MUX 401 is equal to $2^K$ (mod n); when $Y_{1,0}$ is equal to 10, input 502, i.e., $2^{K+1}$ (m n), is selected and the output of MUX 401 is equal to $2^{K+1}$ (mod n); and when $Y_{1,0}$ is equal to 11, input 501, i.e., $(2^K + 2^{K+1})$ (mod n), is selected and the output of MUX 401 is equal to $(2^K + 2^{K+1})$ (mod n). When $Y_{1,0}=0$, the output of MUX 401 is "0". Similarly, input $Y_{3,2}$ may determine the output of MUX 402 by selecting inputs $2^{K+2}$, $2^{K+3}$ and $(2^{K+2} + 2^{K+3})$. The output of MUX 401 is added to the output of MUX 402 by adder 405, and the intermediate sum is processed by modulo 406. The rest of neighboring $Y_{i+1,i}$s are respectively input to multiplexers, and each of the multiplexers selects and outputs a corresponding value selected from a $2^K$ (mod n) table dependent upon the value of the $Y_{i+1,i}$. The modulo result output from modulo 406 is further added to another modulo result output from a neighboring modulo by adder 409, and this intermediate sum output from adder 409 is further processed by modulo 410. The adding and modulo processes are repeated until only one modulo result exists in this repetition. This modulo result is then the final value of $2^K \cdot Y$.

Similarly, in FIG. 3, inputs 504-512 are contained in the $2^K$ (mod n) table, MUX 413 and MUX 423 perform similar functionality as MUX 401 and MUX 402, adder 425 performs similar functionality as adder 405, modulo 426 performs similar functionality as modulo 406, adder 427 performs similar functionality as adder 409 and modulo 428 performs similar functionality as modulo 410.

For example, for $2^K \cdot Y$ (mod n), Y=0000000011001001 (M=8), K=3 and n=3. MUX 401 selects $2^3$ (mod 3)=2 as the output and MUX 402 selects $2^{3+3}$(mod 3)=1 as the output. A third MUX selects 0 as the output because $Y_{5,4}$=0; and a fourth MUX selects $(2^{3+7}+2^{3+6})$(mod 3)=0 as the output because $Y_{7,6}$=11. The output of adder 405 is 3 and the output of modulo 406 is 0. The intermediate sum of the third and fourth MUXs is 0 and thus modulo result of 0 is 0. The modulo result of modulo 406 and the modulo result of the sum of the third and fourth MUXs are further added together by an adder, and this intermediate sum is again processed a modulo. When only single modulo result is obtained (i.e., 0 for this example), the final result of the Montgomery representation $y=2^K \cdot Y$ (mod n) is achieved. In a typical system, K may be equal to eight and M may be equal to eight.

The $2^K$ table, i.e., a table containing values of $2^K$ (mod n), $2^{K+1}$ (mod n), $(2^K+2^{K+1})$(mod n), ..., $2^{K+M-2}$ (mod n), $2^{K+M-1}$ (mod n) and $(2^{K+M-2}+2^{K+M-1})$(mod n), may be either prepared apriorically in a memory or calculated on-the-fly or implement a mix between the two options in order to save memory and cycles at same time. The power of two mod numbers are added based on the value of Y and then accumulated in a Wallace tree. The accumulation complexity is $\log_2$ K and the number of max cycles is only $(\log_2$ K)/2 cycles on the assumption that two steps may be done in one cycle. In the present invention, both of the complexity and calculation time are significantly reduced. For example, when K=8, the algorithm complexity is three and number of cycles is approximately 1 to 1.5 dependent upon the procedure of the calculation process). This means that the whole multiplication process may be done in two cycles (together with the multiplier itself). It is even more important that, in the case of HSDPA S-Table, the calculation may be done recursively and the output of a previous result may be fed back to the input. Therefore, the throughput may be highly dependent on the calculation time for a single result.

Therefore, the Montgomery reduction of the present invention requests less accumulation complexity and less maximum calculation cycles. The method of Montgomery reduction in the present invention may be applied to the applications that are calculating modulo multiplications of (A·B) (mod n), such as interleavers, encryption/decryption and other related applications. The values A and B may be firstly reformed to Montgomery representations $(2^K \cdot A)$ (mod n) and $(2^K \cdot B)$ (mod n) using the scenario of Montgomery reduction of the present invention, then the two resulting Montgomery representations may be processed by a modulo multiplication stage and thus (A·B) (mod n) being obtained.

The present invention is well applicable for exponential use in cryptography and builds an efficient hardware for operating the Montgomery reduction for any modulo multiplication in one cycle.

The present invention enables the users to perform parallel processing with a Wallace tree which reduces the calculation latency from n stages to $\log_2$ n stages.

What is claimed is:

1. A method of calculating a Montgomery representation, comprising:

preparing, by processing circuitry, a table of a plurality of sets, each of the plurality of sets including a value of $2^{K+i}$ (mod n), a value of $2^{K+i+1}$ (mod n) and a value of $(2^{K+i}+2^{K+i+1})$(mod n) corresponding to a value of two neighboring bits $Y_{i+1,i}$ of a binary Y, where i=0 to M−2, n is a modulo number, K is an integer, and M is a number of significant bits in the binary Y;

selecting, by a multiplexer, one of the values within each of the plurality of sets of the table in dependence upon the value of the two neighboring bits $Y_{i+1,i}$ of the binary Y;

respectively adding, by a first plurality of adders, each pair of two neighboring selected values and respectively calculating, by a first plurality of modulo calculators, the modulo value of the sum of the each pair of two neighboring selected values with the modulo number n;

repeatedly adding, by a second plurality of adders, each pair of two neighboring calculated modulo values output from a previous calculation stage until only a single sum is obtained, and repeatedly calculating, by a second plurality of modulo value calculators, the modulo value of the intermediate sum of the two neighboring calculated modulo values until only a single calculated module value is obtained; and setting the single calculated modulo value as the Montgomery representation.

2. The method of claim 1, wherein preparing the table comprises storing the table in a memory prior to the selecting of the values from the table.

3. The method of claim 1, wherein preparing the table comprises calculating the values of the table simultaneously and in parallel with the selecting of the values from the table.

4. The method of claim 1, wherein preparing the table comprises partially storing the table in a memory prior to the selecting of the values from the table and partially calculating the values of the table simultaneously and in parallel with the selecting of the values from the table.

5. An apparatus configured to calculate a Montgomery representation, comprising:

a multiplexer configured to select one of the values within each of a plurality of sets of a table in dependence upon a value of two neighboring bits $Y_{i+1,i}$ of a binary Y, with the table comprising the plurality of sets each including a value of $2^{K+i}$ (mod n), a value of $2^{K+i+1}$ (mod n) and a value of $(2^{K+i}+2^{K+i+1})$(mod n) corresponding to the value of two neighboring bits $Y_{i+1,i}$ of the binary Y, where i=0 to M−2, n is a modulo number, K is an integer, and M is a number of significant bits in the binary Y;

a first plurality of adders configured to respectively add each pair of two neighboring selected values;

a first plurality of modulo value calculators configured to respectively calculate the modulo value of the sum output from each of the first plurality of adders with the modulo number n;

a second plurality of adders configured to repeatedly add each pair of two neighboring calculated modulo values output from the first plurality of modulo value calculators in a previous calculation stage, until only a single sum is obtained; and a plurality of second modulo value calculators configured to respectively calculate the modulo value of an intermediate sum output from each of the second plurality of adders until only a single calculated module value is obtained.

6. The apparatus of claim 5, further comprising a memory configured to store the table prior to the selection of the values from the table.

7. The apparatus of claim 6, further comprising a third modulo value calculator configured to calculate the values in the table simultaneously and in parallel with the selection of the values from the table.

8. The apparatus of claim 5 further comprising a third modulo value calculator configured to calculate the values in the table simultaneously and in parallel with the selection of the values from the table.

9. A method of performing modulo multiplications, comprising:
performing a Montgomery reduction on each of binaries X and Y to obtain $X'=(2^K \cdot X)$ (mod n), and $Y'=(2^K \cdot y)$ (mod n), where n is a modulo number, K is an integer, with the Montgomery reduction comprising:
preparing, by processing circuitry, a table comprising a plurality of sets each including a value of $2^{K+i}$ (mod n), a value of $2^{K+i+1}$ (mod n) and a value of $(2^{K+i}+2^{K+i+1})$ (mod n) corresponding to a value of two neighboring bits $Y_{i+1,i}$ of the binary Y or a value of two neighboring bits $X_{i+1,i}$ the binary X, where i=0 to M−2, and M is a number of significant bits in the binary Y or the binary X;
selecting, by a multiplexer, one of the values within each of the plurality of sets in dependence upon a value of two neighboring bits $Y_{i+1,i}$ of the binary Y, or in dependence upon a value of two neighboring bits $X_{i+1,i}$ of the binary X;
respectively adding, by a first plurality of adders, each pair of two neighboring selected values and respectively calculating, by a first plurality of modulo value calculators, the modulo value of the sum of the each pair of two neighboring selected values with the modulo number n;
repeatedly adding, by a second plurality of adders, each pair of two neighboring calculated modulo values output from a previous calculation stage until only a single sum is obtained, and repeatedly calculating, by a second plurality of modulo value calculators, the modulo value of the intermediate sum of the each pair of two neighboring calculated modulo values until only a single calculated module value is obtained;
setting the single calculated modulo value as the value of the Montgomery representation of X or Y; and
performing a modulo multiplication by using the calculated Montgomery representations $X'=(2^K \cdot X)$(mod n), and $Y'=(2^K \cdot Y)$ (mod n), to obtain a value of $(X \cdot Y)$ (mod n).

10. The method of claim 9, wherein preparing the table comprises storing the table in a memory prior to the selecting of the values from the table.

11. The method of claim 9, wherein preparing the table comprises calculating the values of the table simultaneously and in parallel with the selecting of the values from the table.

12. The method of claim 9, wherein preparing the table comprises:
partially storing the table in a memory prior to the selecting of the values from the table; and
partially calculating the values of the table simultaneously and in parallel with selecting of the values from the table.

13. An apparatus configured to perform modulo multiplications, comprising:
a multiplexer configured to select one of the values within each of a plurality of sets of a table in dependence upon a value of two neighboring bits $Y_{i+1,i}$ of a binary Y, with the table of the plurality of sets, each of the plurality of sets including a value of $2^{K+i}$ (mod n), a value of $2^{K+i+1}$ (mod n) and a value of $(2^{K+i}+2^{K+i+1})$(mod n) corresponding to the value of two neighboring bits $Y_{i+1,i}$ of the binary Y, where i=0 to M−2, n is a modulo number, K is an integer, and M is a number of significant bits in the binary Y;
a first plurality of adders configured to respectively add each pair of two neighboring selected values;
a first plurality of modulo value calculators configured to respectively calculate the modulo value of the sum output from each of the first plurality of adders with the modulo number n;
a second plurality of adders configured to repeatedly add each pair of two neighboring calculated modulo values output from the first plurality of modulo value calculators in a previous calculation stage until only a single sum is obtained;
a plurality of second modulo value calculators configured to respectively calculate the modulo value of the intermediate sum output from each of the second plurality of adders until only a single calculated module value is obtained; and
a modulo multiplication stage configured to calculate a value of $(X \cdot Y)$ (mod n) by using the calculated Montgomery representations $X'=(2^K \cdot X)$ (mod n), and $Y'=(2^K \cdot Y)$ (mod n).

14. The apparatus of claim 13, further comprising a memory configured to store the table prior to the selection of the values from the table.

15. The apparatus of claim 14, further comprising a third modulo value calculator configured to calculate the values in the table simultaneously and parallel with the selection of the values from the table.

16. The apparatus of claim 13, further comprising a third modulo value calculator configured to calculate the values in the table simultaneously and parallel with the selection of the values from the table.

17. A method of calculating a Montgomery representation, comprising:
preparing, by processing circuitry, a table comprising a plurality of sets each including a value of $A_{i1} \cdot 2^i$ (mod n), $A_{i2} \cdot 2^i$ (mod n), . . . , $A_{iN} \cdot 2^i$ (mod n), where i is an integer varying by a value of a predetermined numbers of neighboring bits of a binary Y, n is a modulo number and $A_{i1}$, $A_{i2}$, . . . , $A_{iN}$ are predetermined varied values varying by the value of a predetermined numbers of neighboring bits of the binary Y;
selecting, by a multiplexer, one of the values within each of the plurality of sets of the table in dependence upon the value of the predetermined numbers of neighboring bits of the binary Y;
respectively adding, by a first plurality of adders, each pair of two neighboring selected values and respectively calculating, by a first plurality of modulo value calculators, the modulo value of the sum of the each pair of two neighboring selected values with the modulo number n;
repeatedly adding, by a second plurality of adders, two neighboring calculated modulo values from a previous calculation stage until only a single sum is obtained, and repeatedly calculating, by a second plurality of modulo value calculators, the modulo value of the intermediate sum of the two neighboring calculated modulo values until only a single calculated module value is obtained; and
setting the single calculated modulo value as the value of the Montgomery representation.

18. The method of claim 17, wherein preparing the table comprises storing the table in a memory prior to the selecting of the values from the table.

19. The method of claim 17, wherein preparing the table comprises calculating the values of the table simultaneously and in parallel with the selecting of the one value within each of the sets of the table.

20. The method of claim 17, wherein preparing the table comprises:
- partially storing the table in a memory prior to the selecting of the from the table; and
- partially calculating the values of the table simultaneously and in parallel with the selecting of the values from the table.

21. A method, comprising:
- preparing, by processing circuitry, a table of a plurality of sets, each of the plurality of sets including a value of $2^{K+i}$ (mod n), a value of $2^{K+i+1}$ (mod n) and a value of $(2^{K+i}+2^{K+i+1})$(mod n) corresponding to a value of two neighboring bits $Y_{i+1,i}$ of a binary Y, where i=0 to M−2, n is a modulo number, K is an integer, and M is a number of significant bits in the binary Y;
- selecting, by a multiplexer, one of the values within each of the plurality of sets of the table in dependence upon the value of the two neighboring bits $Y_{i+1,i}$ of the binary Y, with the selections performed in parallel for each of the two neighboring bits $Y_{i+1,i}$ of the binary Y among all of the two neighboring bits $Y_{i+1,i}$ of the binary Y;
- respectively adding, by a first plurality of adders, each pair of two neighboring selected values and respectively calculating, by a first plurality of modulo value calculators, the modulo value of the sum of the each pair of two neighboring selected values with the modulo number n, with the additions and calculations performed in parallel for each pair of two neighboring selected values among all of the pairs of two neighboring selected values;
- repeatedly adding, by a second plurality of adders, each pair of two neighboring calculated modulo values output from a previous calculation stage until only a single sum is obtained, and repeatedly calculating, by a second plurality of modulo value calculators, the modulo value of the intermediate sum of the two neighboring calculated modulo values until only a single calculated module value is obtained, with a calculation latency being $\log_2 K$ stages; and setting the single calculated modulo value as a Montgomery representation.

22. An apparatus, comprising:
- a multiplexer configured to select one of the values within each of a plurality of sets of a table in dependence upon a value of two neighboring bits $Y_{i+1,i}$ of a binary Y, with the table comprising the plurality of sets each including a value of $2^{K+i}$ (mod n), a value of $2^{K+i+1}$ (mod n) and a value of $(2^{K+i}+2^{K+i+1})$(mod n) corresponding to the value of two neighboring bits $Y_{i+1,i}$ of the binary Y where i=0 to M−2, n is a modulo number, K is an integer, and M is a number of significant bits in the binary Y, and with the selections performed in parallel for each of the two neighboring bits $Y_{i+1,i}$ of the binary Y among all of the two neighboring bits $Y_{i+1,i}$ of the binary Y;
- a first plurality of adders configured to respectively add each pair of two neighboring selected values, with the additions performed in parallel for each pair of two neighboring selected values among all of the pairs of two neighboring selected values;
- a first plurality of modulo value calculators configured to respectively calculate the modulo value of the sum output from each of the first plurality of adders with the modulo number n, with the calculations performed in parallel for each pair of two neighboring selected values among all of the pairs of two neighboring selected values;
- a second plurality of adders configured to repeatedly add each pair of two neighboring calculated modulo values output from the first plurality of modulo value calculators in a previous calculation stage until only a single sum is obtained; and
- a plurality of second modulo value calculators configured to respectively calculate the modulo value of an intermediate sum output from each of the second plurality of adders until only a single calculated module value being a Montgomery representation is obtained, with a calculation latency being $\log_2 K$ stages.

* * * * *